Patented Dec. 6, 1932

1,890,180

UNITED STATES PATENT OFFICE

FREDERICK H. HOFFMAN, OF COLUMBUS, OHIO

FOOD COMPOUND

No Drawing.      Application filed July 21, 1928. Serial No. 294,591.

It has been attempted many times to make and market a compound of peanut butter and honey but without success, because an ordinary mixture of said ingredients results inevitably in a crystallization of the honey, thereby rendering the mixture unpalatable and, therefore, unsalable. It has been my object to discover a process whereby a food compound having for its basic elements peanut and honey in which crystallization of the honey does not take place and I have discovered that by mixing the following ingredients in the proportions stated very satisfactory results are obtained, to wit:

Take of peanut butter consisting of roasted and ground peanuts, approximately 73 percent by weight; of strained bees' honey approximately 15 percent by weight; and of peanut oil made from green peanuts approximately 12 percent by weight and thoroughly mix together in any order and by any suitable means.

I have discovered that the product of this process is very palatable and does not result in crystallization.

The proportions of materials introduced in the process can be varied without departing from the invention.

What I claim is:

1. The process of preventing the crystallization of honey in a compound of honey and peanut butter containing its normal oil consisting in adding to the compound approximately twelve per cent by weight of green peanut oil.

2. An edible compound consisting of the following ingredients in approximately these proportions by weight, to wit: ground roasted peanuts, seventy three percent, strained honey, fifteen percent, oil of green peanuts, twelve percent.

FREDERICK H. HOFFMAN.